United States Patent
Hara et al.

(10) Patent No.: US 10,590,274 B2
(45) Date of Patent: Mar. 17, 2020

(54) SILICONE COMPOSITION, A CURED SILICONE RUBBER PRODUCT AND A POWER CABLE

(71) Applicant: Shin-Etsu Chemical Co., Ltd., Tokyo (JP)

(72) Inventors: Tatsuei Hara, Annaka (JP); Yoshiaki Koike, Annaka (JP); Kazuhiro Oishi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 16/163,999

(22) Filed: Oct. 18, 2018

(65) Prior Publication Data
US 2019/0119495 A1 Apr. 25, 2019

(30) Foreign Application Priority Data

Oct. 20, 2017 (JP) ................. 2017-203038

(51) Int. Cl.
| | |
|---|---|
| *C08L 83/04* | (2006.01) |
| *C08L 83/14* | (2006.01) |
| *H01B 3/46* | (2006.01) |
| *C08G 77/00* | (2006.01) |
| *H01B 3/28* | (2006.01) |
| *C08G 77/20* | (2006.01) |
| *C08G 77/26* | (2006.01) |
| *C08G 77/12* | (2006.01) |
| *C08K 5/14* | (2006.01) |

(52) U.S. Cl.
CPC ............ *C08L 83/14* (2013.01); *C08G 77/12* (2013.01); *C08G 77/20* (2013.01); *C08G 77/26* (2013.01); *C08G 77/70* (2013.01); *C08G 77/80* (2013.01); *C08K 5/14* (2013.01); *C08L 83/04* (2013.01); *H01B 3/28* (2013.01); *H01B 3/46* (2013.01); *C08L 2203/202* (2013.01); *C08L 2205/025* (2013.01)

(58) Field of Classification Search
CPC ................. C08L 83/14; C08K 3/36
USPC .......................................... 525/478
See application file for complete search history.

(56) References Cited

U.S. PATENT DOCUMENTS

| 4,678,827 A * | 7/1987 | Itoh .................. C08K 3/36 524/188 |
|---|---|---|
| 5,618,880 A * | 4/1997 | Okazaki ............. B60R 16/0222 524/731 |
| 6,890,662 B2 * | 5/2005 | Yaginuma ............ C08L 83/04 174/68.1 |
| 2003/0232202 A1 * | 12/2003 | Yaginuma ............ C08L 83/04 428/447 |
| 2004/0092643 A1 | 5/2004 | Tiburtius et al. |
| 2013/0225735 A1 | 8/2013 | Matsukura et al. |

FOREIGN PATENT DOCUMENTS

| JP | 61-228062 A | 10/1986 |
|---|---|---|
| JP | 9-284977 A | 10/1997 |
| JP | 2004-18701 A | 1/2004 |
| JP | 2005-89587 A | 4/2005 |
| JP | 2012-92305 A | 5/2012 |

OTHER PUBLICATIONS

JP 2005-089587, Apr. 2005.*
Extended European Search Report dated Dec. 21, 2018, in European Patent Application No. 18201547.9.

* cited by examiner

*Primary Examiner* — Margaret G Moore
(74) *Attorney, Agent, or Firm* — Birch, Stewart, Kolasch & Birch, LLP

(57) ABSTRACT

The present invention provides a silicone composition comprising components (A) to (F); (A) 100 parts by mass of a raw rubber-like, at 25 degrees C., organopolysiloxane having at least two alkenyl groups each bonded to a silicon atom; (B) 5 to 100 parts by mass of silica powder having a specific surface area of 50 $m^2/g$ or more; (C) platinum or a platinum compound in an amount of 1 to 1,000 ppm by mass as a platinum atom, relative to the mass of component (A); (D) 0.01 to 5 parts by mass of a compound selected from an organic silicon compound having a nitrogen-containing organic group and an unsaturated hydrocarbon group, and benzotriazole and a derivative thereof; (E) an addition reaction curing agent other than said component (C), or an organic peroxide in an effective amount to cure the composition, and (F) 0.01 to 5 parts by mass of an aromatic hydrocarbon group-containing organopolysiloxane represented by the general formula (1) wherein a proportion of the number of the monovalent aromatic hydrocarbon group to the total number of the substituents $R^1$, $R^2$ and $R^3$ is 41% or more and less than 46%.

9 Claims, No Drawings

SILICONE COMPOSITION, A CURED SILICONE RUBBER PRODUCT AND A POWER CABLE

CROSS REFERENCE

This application claims the benefits of Japanese Patent Application No. 2017-203038 filed on Oct. 20, 2017, the contents of which are hereby incorporated by reference.

FIELD OF THE INVENTION

The present invention relates to a silicone composition which provides an electrically insulating silicone rubber, specifically a silicone composition which may be used in connection portions of power cables, such as intermediate connection portions in which power cables are connected to each other, or terminal connection portions in which power cable is connected to terminal fittings. Further, the present invention relates to a power cable provided with a cured product of the silicone composition at the connecting portion.

An insulating member, particularly an electrically insulating enclosure, is used in a connection portion of power cables, such as an intermediate connection portion in which power cables are connected to each other, or a terminal connection portion in which power cable is connected to a terminal fitting. The insulating member is formed from a silicone rubber having an excellent electrical-insulation property, or an elastic rubber such as an ethylene-propylene rubber (for short, EP rubber).

The following three methods are generally known for connecting power cables. First, an insulating enclosure is slid over a sheath of a power cable up to a connecting portion of the power cable. Second, connection is formed while returning the inversion of an inverted enclosure. The third is a cold shrinkage method in which a core is inserted inside an insulating enclosure beforehand, the enclosure is moved up to a connecting portion of an electric power cable while being expanded by the core material and, then, the core is pulled out, so that the enclosure shrinks. Third, cold shrinkage method is preferable and used in the view of its workability.

A rubber material to be used particularly for the cold-shrinkage enclosure needs to be easily expanded in diameter, to have a small tensile permanent strain which is a measure for good restoration after the core is removed, a good tensile strength and tear strength and, further, a good tracking resistance in electric insulation. Preferable rubber physical properties are a tensile strength of 8 MPa or more, a tear strength (crescent) of 25 N/mm or more, an elongation at break of 600% or more, and a target tensile permanent strain of 20 or less under the 100% elongation test condition, 22 hours at 180 degrees C., as determined in accordance with JIS K 6249:2003.

Compared the silicone rubber with the EP rubber, the silicone rubber has a smaller tensile permanent strain, so that it has good restorability and excellent sealing and close fitting properties between the silicone rubber and the cable after removing the core. In addition, the silicone rubber may be of high elongation, so that the diameter expansion is easy.

However, when the silicone rubber is used outdoors, it has a problem that tracking occurs under leakage current to deteriorate. In more severe environmental conditions, erosion is liable to occur on the insulating member surface to shorten a life of the enclosure. In order to improve the tracking resistance and to have an excellent electrical insulation property in the a silicone rubber, it is necessary to comprise a large content of aluminum hydroxide and, as a result, the mechanical strength of the rubber is worsen and the aforesaid physical properties of the rubber are not satisfied.

Japanese Patent Application Laid-Open No. Sho-61-228062/1986 describes a flame-retardant silicone rubber composition comprising an organosilicon compound having a nitrogen-containing organic group and an unsaturated group, and a platinum-based compound. Although the silicone rubber composition has an excellent flame retardance, properties such as mechanical strength are insufficient for connecting a power cable.

Japanese Patent Application Laid-Open No. Hei-9-284977/1997 describes an enclosure for connecting a power cable, which comprises benzotriazole and a platinum compound. However, aluminum hydroxide is essential and the mechanical strength is inferior.

Japanese Patent Application Laid-Open No. 2004-018701 describes a silicone rubber composition which comprises a phenyl silicone and has tracking resistance. The silicone rubber composition has mechanical strength, the tracking resistance is improved to pass the standard of tracking resistance (IEC Publication 587). Japanese Patent Application Laid-Open No. 2012-092305 describes a liquid silicone rubber composition for high voltage electrical insulation parts, which contains silica surface-treated with a vinyl group-containing organosilicon compound.

PRIOR LITERATURES

Patent Literature 1: Japanese Patent Application Laid-Open No. Sho-61-228062/1986
Patent Literature 2: Japanese Patent Application Laid-Open No. Hei-9-284977/1997
Patent Literature 3: Japanese Patent Application Laid-Open No. 2004-018701.
Patent Literature 4: Japanese Patent Application Laid-Open No. 2012-092305

SUMMARY OF THE INVENTION

However, the silicone rubber composition described in Patent Literature 3 shows a somewhat large corrosion depth after erosion. The silicone rubber composition described in Patent Literature 4 has a similar problem.

One of the purposes of the present invention is to provide a silicone composition providing a cured product which has small tensile permanent strain and excellent mechanical strength such as tensile strength and tear strength, further has excellent high-voltage electrical insulation and shows prevented progress of destruction after erosion occurs. Further, the other purposes of the present invention are to provide a power cable provided with the cured product of the silicone composition as a connecting member.

The present inventors have made research and found that a cured product having an excellent tracking resistance even without aluminum hydroxide and showing prevented progress of destruction after erosion occurs is provided from a silicone composition which comprises a raw rubber-like organopolysiloxane having at least two alkenyl groups each bonded to a silicon atom, (B) silica powder, (C) platinum or a platinum compound, (D) a compound selected from an organic silicon compound having a nitrogen-containing organic group and an unsaturated hydrocarbon group, and benzotriazole or a derivative thereof, and (E) a curing agent and further comprises a specific amount of (F) an organopolysiloxane having an aromatic hydrocarbon group in a specific amount, particularly a silicone oil.

Thus, the present invention provides a silicone composition comprising components (A) to (F), (A) 100 parts by mass of a raw rubber-like, at 25 degrees C., organopolysiloxane having at least two alkenyl groups each bonded to a silicon atom, (B) 5 to 100 parts by mass of silica powder having a specific surface area of 50 $m^2/g$ or more, (C) platinum or a platinum compound in an amount of 1 to 1,000 ppm by mass as a platinum atom, relative to the mass of component (A), (D) 0.01 to 5 parts by mass of a compound selected from an organic silicon compound having a nitrogen-containing organic group and an unsaturated hydrocarbon group, and benzotriazole and a derivative thereof, (E) an addition reaction curing agent other than said component (C), or an organic peroxide in an effective amount to cure the composition, and (F) 0.01 to 5 parts by mass of an aromatic hydrocarbon group-containing organopolysiloxane represented by the following general formula (1):

$(R^1{}_3SiO_{1/2})_{n1}(R^1R^2SiO_{2/2})_{n2}(R^3SiO_{3/2})_{n3}(SiO_{4/2})_{n4}$ (1), wherein $R^1$ is, independently of each other, a monovalent saturated aliphatic hydrocarbon group having 1 to 10 carbon atoms, $R^2$ is, independently of each other, a monovalent aromatic hydrocarbon group having 6 to 12 carbon atoms, $R^3$ is, independently of each other, a monovalent saturated aliphatic hydrocarbon group having 1 to 10 carbon atoms or a monovalent aromatic hydrocarbon group having 6 to 12 carbon atoms, wherein a proportion of the number of the monovalent aromatic hydrocarbon group to the total number of the substituents $R^1$, $R^2$ and $R^3$ is 41% or more and less than 46%, n1 is an integer of from 2 to 5, n2 is an integer of from 15 to 25, a total of n3 and n4 is an integer of from 0 to 3, $0<=\{n4/(n3+n4)\}\times100<=5$, and a total of n1, n2, n3 and n4 is an integer of from 17 to 30.

The present invention provides the silicone composition, wherein component (A) preferably comprises the following components (A-1) and (A-2);

(A-1) a raw rubber-like, at 25 degrees C., organopolysiloxane having 0.001 to 2% of the alkenyl group, based on the total number of the substituents bonded to silicon atoms in an amount of 60 to 99 parts by mass, and (A-2) a raw rubber-like, at 25 degrees C., organopolysiloxane having more than 2% and 20% or less of the alkenyl group, based on the total number of substituents bonded to silicon atoms, in an amount such that a total amount of components (A-1) and (A-2) is 100 parts by mass.

The present invention further provides a silicone composition for a power cable, a cured silicone rubber product obtained from the silicone composition, and a power cable provided with the cured silicone rubber product.

The silicone rubber product obtained by curing the present silicone composition has small tensile permanent strain, excellent mechanical strength such as tensile strength and tear strength, and excellent high-voltage electrical insulation and prevented progress of destruction after erosion occurs. Accordingly, the present silicone composition is suitable for connecting a power cable, where a power cable is provided with the cured product of the silicone composition as a connecting member.

The present invention will be described below in detail. The average polymerization degree described in the present invention is a weight average molecular weight determined by gel permeation chromatography, i.e., GPC, and reduced to polystyrene. Conditions in GPC were as follows.

[GPC Conditions]
Solvent: Tetrahydrofuran
Flow Rate: 0.6 mL/min.
Detector: Differential refractive index detector (RI)
Columns:
TSK Guardcolumn SuperH-L
TSKgel SuperH4000 (6.0 mmI.D.×15 cm×1)
TSKgel SuperH3000 (6.0 mmI.D.×15 cm×1)
TSKgel SuperH2000 (6.0 mmI.D.×15 cm×2)
all provided by TOSOH Cop.
Column Temperature: 40 degrees C.
Injection Volume: 20 μL of a 0.5% by weight solution in THF.

(A) Alkenyl Group-Containing Raw Rubber-Like Organopolysiloxane

Component (A) is a raw rubber-like, at 25 degrees C., organopolysiloxane having at least two alkenyl groups each bonded to a silicon atom. Examples of the alkenyl group include a vinyl group, an allyl group, a butenyl group, and a hexenyl group, preferably a vinyl group. The alkenyl groups may be present at the ends of the molecular chain, at the side chains, or both. In the present invention, the term "raw rubber-like" means a very viscous state showing a viscosity of 10,000 mPa·s or more, particularly 100,000 mPa·s or more, or a non-liquid state, such as pasty or solid, having no self-fluidity both at room temperature, i.e. 25 degrees C. In the present invention, the viscosity is determined by a rotational viscometer.

The component (A) are preferably the following components (A-1) and (A-2).

(A-1) a raw rubber-like, at 25 degrees C., organopolysiloxane having 0.001 to 2% of the alkenyl group, based on the total number of the substituents bonded to silicon atoms.

(A-2) a raw rubber-like, at 25 degrees C., organopolysiloxane having more than 2% and 20% or less of the alkenyl group, based on the total number of substituents bonded to silicon atoms.

On account of the combination of components (A-1) and (A-2), the cured product obtained by curing the silicone composition has an excellent rubber properties such as tear strength. Thus, the present silicone composition preferably comprises the combination of (A-1) the organopolysiloxane having a relatively small amount of an alkenyl group and (A-2) the organopolysiloxane having a relatively large amount of an alkenyl group at a specific ratio. The amount of component (A-1) is 60 to 99 parts by mass, preferably 90 to 99 parts by mass, relative to a total 100 parts by mass of components (A-1) and (A-2).

The components (A-1) and (A-2) are preferably ones represented by the following average composition formula (2):

$R_aSiO_{(4-a)/2}$ (2)

wherein R is, independently of each other, unsubstituted or substituted, monovalent hydrocarbon group having 1 to 12 carbon atoms, a is a positive number of 1.95 to 2.04, and at least one of R is an alkenyl group.

The aforesaid organopolysiloxane is generally prepared by a cohydrolysis condensation of one or more organohalogenosilanes or a ring opening polymerization of a cyclic polysiloxane, such as a trimer or tetramer of a siloxane, in the presence of an alkaline or acidic catalyst. The present organopolysiloxane is mainly a linear diorganopolysiloxane, but may have a branch. The organopolysiloxane may be a combination of two or more kinds of the organopolysiloxanes having different molecular structures.

Components (A-1) and (A-2) will be described below in detail.

Component (A-1) has an alkenyl group in an amount of 0.001 to 2%, preferably 0.001 to 1%, based on the total number of the substituents each bonded to a silicon atom, that is, the total number of R in the aforesaid formula (2). The alkenyl group is as defined above, preferably a vinyl group. The alkenyl group may be present at the end of the molecular chain, at the side chain, or both.

For R in the formula (2), the group other than the alkenyl group is an unsubstituted or substituted, monovalent hydrocarbon group having 1 to 12, preferably 1 to 8 carbon atoms; such as an alkyl group such as a methyl group, an ethyl group, a propyl group, a butyl group, a hexyl group and a dodecyl group; a cycloalkyl group such as a cyclohexyl group; an aryl group such as a phenyl group and a tolyl group; an aralkyl group such as a β-phenyl group; and those hydrocarbon groups wherein a part or all of the hydrogen atoms bonded to a carbon atom of these groups is substituted with a substituent such as a halogen atom and a cyano group; such as a chloromethyl group, a trifluoropropyryl group, or a cyanoethyl group. Particularly, it is preferable that 80% or more, more preferably 90% or more, of the total number of R other than the alkenyl group is a methyl group.

"a" is a positive number of 1.95 to 2.04, preferably 1.97 to 2.02. Preferred is that the terminals of the molecular chain are blocked with triorganosilyl groups, such as a trimethylsilyl group, a dimethylvinylsilyl group and a trivinylsilyl group, particularly blocked with an alkenyl group-containing silyl group.

An average polymerization degree of the component (A-1) is preferably 3,000 or more, and preferably at most 100,000. In particular, component (A-1) has the average polymerization degree of 5,000 to 20,000. The average polymerization degree is a weight average molecular weight as determined by gel permeation chromatography (GPC), reduced to polystyrene as a standard substance. The determination conditions are as described above.

Component (A-2) has an alkenyl group in an amount of more than 2% to 20%, preferably 3 to 15%, based on the total number of the substituents each bonded to a silicon atom, that is, the total number of R in the aforesaid formula (2). The alkenyl group is as defined above, preferably a vinyl group. The alkenyl group may be present at the end of the molecular chain, at the side chain, or both.

For R in the formula (2), the group other than the alkenyl group is an unsubstituted or substituted, monovalent hydrocarbon group having 1 to 12, preferably 1 to 8 carbon atoms, as defined for component (A-1) above. Particularly, it is preferable that 80% or more, more preferably 90% or more, of the total number of R other than the alkenyl group is a methyl group.

"a" is a positive number of 1.95 to 2.04, preferably 1.97 to 2.02. Preferred is that the terminals of the molecular chain are blocked with triorganosilyl groups, such as a trimethylsilyl group, a dimethylvinylsilyl group and a trivinylsilyl group, particularly blocked with an alkenyl group-containing silyl group.

An average polymerization degree of the component (A-2) is preferably 3,000 or more, and preferably at most 100,000. In particular, component (A-2) has the average polymerization degree of 5,000 to 20,000. The average polymerization degree is a weight average molecular weight as determined by gel permeation chromatography (GPC), reduced to polystyrene as a standard substance. The determination conditions are as described above.

(B) Silica Powder

The silica powder has a specific surface area of 50 m$^2$/g or more, preferably 100 to 400 m$^2$/g, as determined by a BET method, and is, particularly, silica fine powder. On account of the silica powder, a cured silicone rubber product has an excellent mechanical strength. Examples of the silica powder include fumed silica called "dry silica" and precipitated silica called "wet silica". Among these, fumed silica is preferable. Preferably, the surface of these silica is hydrophobized with an organosilicon compound such as an organopolysiloxane, an organopolysilazane, a chlorosilane and an alkoxysilane. These silica powder may be used single or in combination of two or more of kinds of them.

The amount of the silica powder is 5 to 100 parts by mass, preferably 10 to 90 parts by mass, particularly 30 to 80 parts by mass, relative to 100 parts by mass of component (A). If the amount is smaller than the lower limit, a sufficient reinforcing effect is not obtained. If the amount is larger than the upper limit, the processability of the composition deteriorates and the physical properties of the resulting cured silicone rubber product deteriorate.

(C) Platinum or a Platinum Compound

The present silicone composition comprises platinum or a platinum compound. The platinum or the platinum compound improves flame retardancy and tracking resistance of the cured silicone rubber. By the use of component (C) in combination with components (D) and (F) described later, higher tracking resistance is obtained.

Examples of component (C) is an elementary platinum, particulate platinum adsorbed on a carrier such as silica, alumina or silica gel, a platinum compound such as a platinum complex, platinum chloride, chloroplatinic acid, a complex of chloroplatinic acid hexahydrate with olefin or a divinyl dimethyl polysiloxane, an alcohol solution of chloroplatinic acid hexahydrate, furthermore, an aldehyde compound of chloroplatinic acid hexahydrate, and a platinum complex with various olefins or an ether compound. The amount of component (C) may be 1 to 1,000 ppm by mass, preferably 5 to 500 ppm by mass, as a platinum group metal, relative to the mass of component (A).

(D) Organic Silicon Compound Having a Nitrogen-Containing Organic Group and an Unsaturated Hydrocarbon Group and/or Benzotriazole or a Derivative Thereof The present silicone composition comprises an organic silicon compound having a nitrogen-containing organic group and an unsaturated hydrocarbon group and/or benzotriazole or a derivative thereof. By the use of component (D) in combination with the components (C) and (F), tracking resistance is further improved. As long as the component (D) is incorporated within the range of the amount described later, it does not affect the physical properties after curing, so that a cured product has an excellent mechanical strength. Component (D) may be at least one of the organic silicon compound having a nitrogen-containing organic group and an unsaturated hydrocarbon group, and benzotriazole or a derivative thereof. Preferred is a combination of the organic silicon compound having a nitrogen-containing organic group and an unsaturated hydrocarbon group, with benzotriazole or a derivative thereof.

The nitrogen-containing organic group of the organic silicon compound is, for instance, an aminoalkyl group having 1 to 5 carbon atoms, preferably 1 to 3 carbon atoms, and imino group. The unsaturated hydrocarbon group is, for instance, an alkenyl group having 2 to 5 carbon atoms, preferably a vinyl group. The organic silicon compound is an organosilane or an organosiloxane. The nitrogen-containing organic group and the unsaturated hydrocarbon group may be bonded to the same silicone atom or to different silicon atoms, or may form a group having both the unsaturated hydrocarbon group and the nitrogen-containing organic group to bond to a silicon atom. Examples of the groups other than the nitrogen-containing organic group and the unsaturated hydrocarbon group include an alkyl group having 1 to 10 carbon atoms, and an alkoxy group having 1 to 5 carbon atoms.

The group having the unsaturated hydrocarbon group and the nitrogen-containing organic group includes, for instance, the following groups.

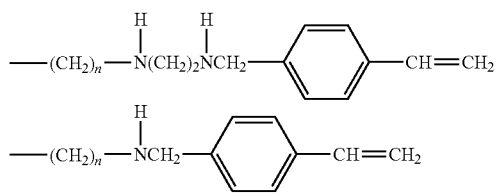

wherein n is an integer of from 1 to 3.

Examples of such organic silicon compounds include the organosilanes represented by the following formulas, or siloxanes obtained by hydrolyzing these.

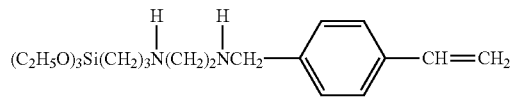

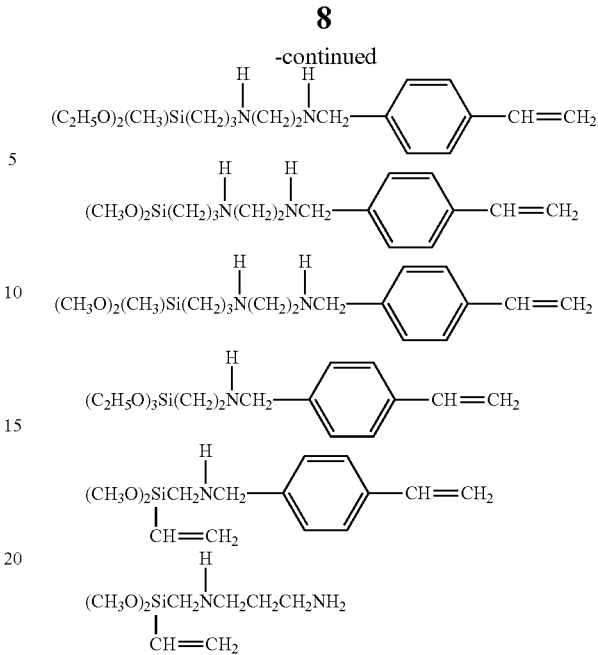

The organic silicon compound may be a cohydrolyzable siloxane of a silane having the nitrogen-containing organic group such as an aminoalkyl group, preferably having 1 to 3 carbon atoms, and an imino group with a silane having the unsaturated hydrocarbon group such as an alkenyl group, preferably a vinyl group or a propenyl group. Alternatively, the organic silicon compound may be a cohydrolyzed siloxane of a silane having the nitrogen-containing organic group and a silane having the unsaturated hydrocarbon group with a silane having none of these groups. For instance, these siloxanes may be the following ones.

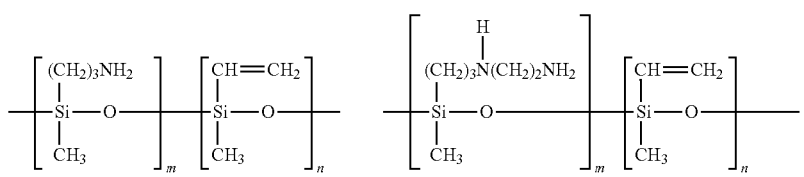

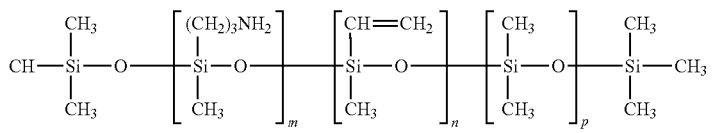

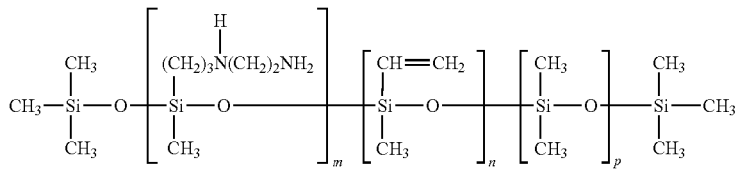

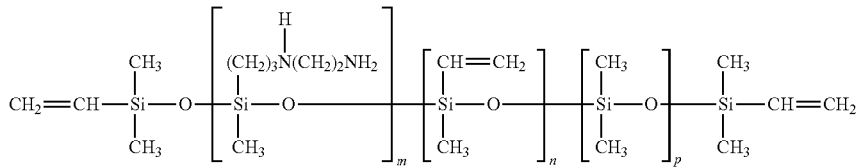

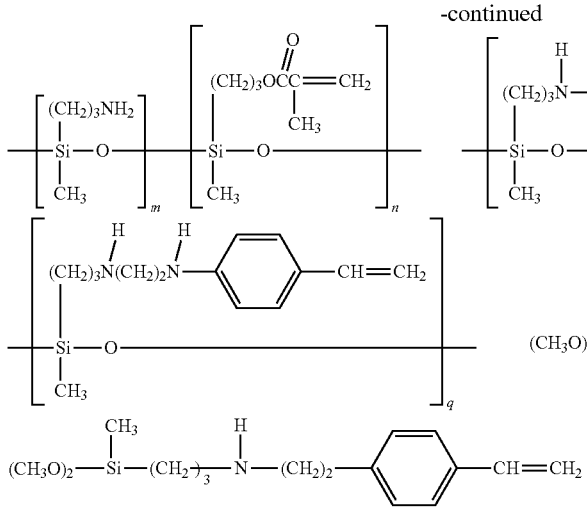
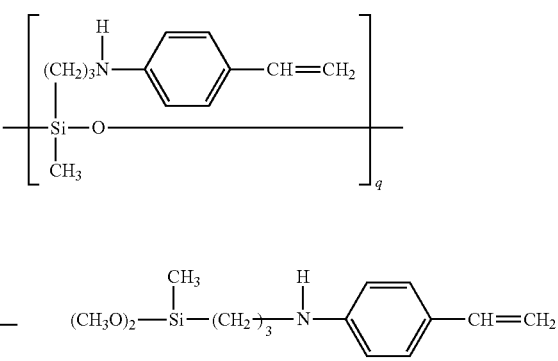

wherein m is an integer of 1 or more, preferably an integer of from 1 to 30, n is an integer of 1 or more, preferably an integer of from 1 to 50, p is an integer of 1 or more, preferably an integer of from 1 to 500, q is an integer of 2 or more, preferably an integer of from 3 to 10.

Examples of benzotriazole or derivatives thereof is benzotriazole, 1-methylbenzotriazole, 5,6-dimethylbenzothiazole, 2-phenylbenzothiazole, 1-hydroxybenzotriazole, methyl 1-benzotriazole carboxylate, and the benzotriazole derivatives represented by the following formulas.

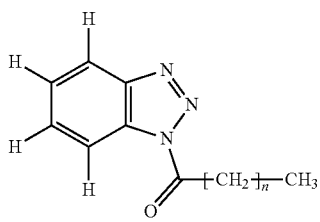

wherein n is an integer of from 0 to 6.

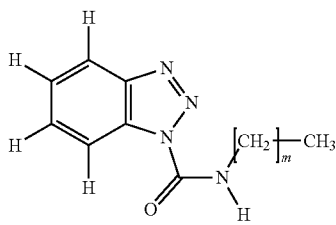

wherein m is an integer of from 1 to 6.

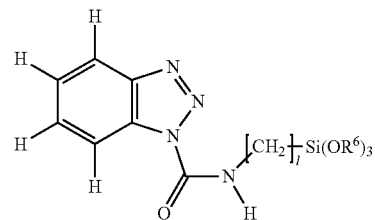

wherein "l" is an integer of from 1 to 6, and $R^6$ is an alkyl group or a trialkylsilyl group.

When the benzotriazole is solid at room temperature, it may be made into a solution in alcohol or into a paste such as a silicone oil paste or a silicone raw rubber paste, in order to improve dispersibility in the composition.

The amount of component (D) is 0.01 to 5 parts by mass, preferably 0.1 to 2 parts by mass, relative to 100 parts by mass of component (A). When both of the organic silicon compound and the benzotriazoles are incorporated, the aforesaid amount is a total amount of the both. If the amount is smaller than the lower limit, tracking resistance is not improved. Even if the amount is larger than the upper limit, the tracking resistance-improving effect is not increased any more, and curing inhibition may occur in an addition curing reaction, which is not preferable.

(E) Curing Agent

The present silicone composition further comprises a curing agent. The curing agent may be an addition reaction curing agent or an organic peroxide which are conventionally known as a curing agent for an alkenyl group-containing silicone composition. Examples of the curing agents for addition reactions include an organohydrogenpolysiloxane and platinum-based catalysts other than the aforesaid component (C). The amount of the curing agent may be as required, i.e. an effective amount, to cure the present silicone composition and may be appropriately adjusted as in conventional compositions.

The organohydrogerpolysiloxane is, for instance, represented by the following formula (3):

$$H_b R^3_c SiO_{(4-b-c)/2} \tag{3}$$

wherein $R^3$ is, independently of each other, a substituted or unsubstituted, monovalent hydrocarbon group, $0<b<=3$, $0<=c<3$, and $0<b+c<=3$.

The organohydrogenpolysiloxane may be linear, branched, or cyclic as long as it has two or more hydrosilyl groups, i.e. SiH group, in the molecule. The organohydrogenpolysiloxane preferably has an average degree of polymerization of 300 or less.

Examples of the organohydrogenpolysiloxane include a diorganopolysiloxane end-capped with dimethylhydrogensilyl groups, a copolymer of dimethylsiloxane units, methylhydrogensiloxane units and terminal trimethylsiloxy units, a low viscosity fluid comprising dimethylhydrogensiloxane units ($H(CH_3)_2SiO_{0.5}$ units) and $SiO_2$ units, 1,3,5,7-tetrahydrogen-1,3,5,7-tetramethylcyclotetrasiloxane, 1-propyl-3,5,7-trihydrogen-1,3,5,7-tetramethyl cyclotetrasiloxane, and 1,5-dihydrogen-3,7-dihexyl-1,3,5,7-tetramethylcyclotetrasiloxane.

The amount of the organohydrogenpolysiloxane is preferably such that a ratio of the number of hydrogen atoms bonded to the silicon atoms, i.e. SiH group, in the organohydrogenpolysiloxane to the total number of the alkenyl groups in (A) the organopolysiloxane, i.e. H/Vi, is preferably 0.5 to 10, more preferably 1 to 5.

Examples of the platinum-based catalyst include an elementary platinum, platinum compounds such as a platinum complex, a chloroplatinic acid, a complex of a chloroplatinic acid with alcohol, aldehyde, ether and various olefins. The platinum-based catalyst other than component (C) may not be used because component (C) functions as the platinum-based catalyst for the addition reaction. Alternatively, the platinum-based catalyst may be used in combination with component (C), wherein the total amount of component (C) and the platinum-based catalyst other than component (C) may be 2 to 2,000 ppm by mass, preferably 6 to 1,000 ppm by mass, as platinum metal, relative to the mass of component (A).

Examples of the organic peroxide include benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, and t-butyl perbenzoate. The amount of the organic peroxide is 0.1 to 5 parts by mass, relative to 100 parts by mass of component (A).

(F) Aromatic Hydrocarbon Group-Containing Organopolysiloxane

The present silicone composition is characterized in that this comprises the aromatic hydrocarbon group-containing organopolysiloxane represented by the following general formula (1). The aromatic hydrocarbon group-containing organopolysiloxane further improves tracking resistance.

$$(R^1{}_3SiO_{1/2})_{n1}(R^1R^2SiO_{2/2})_{n2}(R^3SiO_{3/2})_{n3}(SiO_{4/2})_{n4} \quad (1),$$

wherein $R^1$ is, independently of each other, a monovalent saturated aliphatic hydrocarbon group having 1 to 10 carbon atoms, $R^2$ is, independently of each other, a monovalent aromatic hydrocarbon group having 6 to 12 carbon atoms, $R^3$ is, independently of each other, a monovalent saturated aliphatic hydrocarbon group having 1 to 10 carbon atoms or a monovalent aromatic hydrocarbon group having 6 to 12 carbon atoms, wherein a percentage of the number of a monovalent aromatic hydrocarbon group, based on the total number of the substituents $R^1$, $R^2$ and $R^3$, is 41% or more and less than 46%, preferably 41 to 43%, n1 is an integer of from 2 to 5, n2 is an integer of from 15 to 25, the total of n3 and n4 is an integer of from 0 to 3, $0<=\{n4/(n3+n4)\}\times 1.00<=5$, and the total of n1, n2, n3 and n4 is an integer of from 17 to 30.

In the above formula (1), n1 is an integer of from 2 to 5, preferably 2 or 3, n2 is an integer of from 15 to 25, preferably 1.5 to 22, the total of n3 and n4 is an integer of from 0 to 3, preferably 0 or 1, $0<=\{n4/(n3+n4)\}\times 100<=5$, preferably $0<=\{n4/(n3+n4)\}\times 100<=1$, and the total of n1, n2, n3 and n4 is an integer of from 17 to 30, preferably an integer of from 17 to 28. The organopolysiloxane is particularly in the form of an oil.

If any of n1, n2, n3 and n4 exceeds the aforesaid range, no protective effect for a material surface is obtained, so that the effect of preventing the progress of erosion cannot be attained. If the siloxane chain length, i.e. the total of n1+n2+n3+n4, is less than the aforesaid lower limit, the effect of preventing the progress of erosion cannot be attained.

A branched structure (T unit and/or Q unit) may be introduced into the linear organopolysiloxane so that n1, n2, n3 and n4 satisfy the aforesaid range in the present aromatic hydrocarbon group-containing organopolysiloxane. Then, the polarity between the organopolysiloxane and the other components may also be adjusted and the tracking resistance can be thereby controlled. The present organopolysiloxane has a siloxane chain length, that is, total of n1+n2+n3+n4, of 17 to 30, preferably 17 to 28, and the amount of the aromatic hydrocarbon group is 41% or more and less than 46%, preferably 41 to 43 mole %, based on the total number of the substituents each bonded to the silicon atom, that is, $R^1$, $R^2$ and $R^3$. On account of the siloxane chain length, erosion can be suppressed. In particular, when the amount of the aromatic hydrocarbon group is less than the aforesaid lower limit or exceeds the aforesaid upper limit, the obtained cured product shows a large erosion depth after erosion occurs and the progress of destruction to form a through hole cannot be prevented.

In the aforesaid formula (1), examples of $R^1$ include an alkyl group such as a methyl group, an ethyl group, a propyl group, a butyl group, a hexyl group, and a cyclohexyl group. Among these, a methyl group is preferred. Examples of $R^2$ is an aryl group such as a phenyl group and a tolyl group, and an aralkyl group such as a benzyl group and a 2-phenylethyl group. Among these, a phenyl group is preferred. $R^3$ is selected from the groups defined for $R^1$ and $R^2$.

Component (F) is preferably an organopolysiloxane represented by the following formula (2):

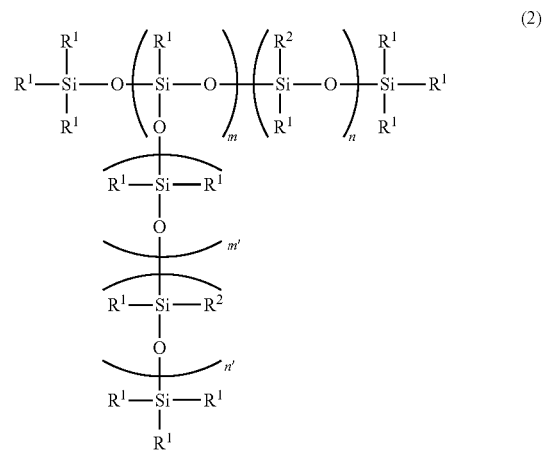

wherein $R^1$ and $R^2$ are as defined above, the amount of the monovalent aromatic hydrocarbon group is 41% or more and less than 46%, based on the total number of the substituents each bonded to the silicon atom, that is, $R^1$ and $R^2$, m is an integer of from 0 to 3, m' is an integer of from 0 to 3, n' is an integer of from 0 to 3, n is an integer of from 10 to 20, and the total of m, m', n and n' is an integer of from 14 to 27.

In the formula (2), m is an integer of from 0 to 3, preferably 0 to 2, m' and n' are integers of from 0 to 3, preferably 0 or 1, and n is an integer of from 10 to 20, preferably 12 to 18, m+m'+n+n' is an integer of from 14 to 27, preferably 17 to 25.

The amount of component (F) is 0.01 to 5 parts by mass, preferably 0.1 to 2 parts by mass, relative to 100 parts by mass of component (A). If the amount of the component (F) is less than the aforesaid lower limit, a sufficient effect is not attained. If the amount of the component (F) exceeds the aforesaid upper limit, component (F) may bleed on the rubber surface to cause stain on the surface of the cured rubber product.

Other Additives

The silicone composition of the present invention may comprise, if necessary, other additives which are conventionally added in a silicone composition, in addition to the aforesaid components. The amount of the additives may be appropriately determined as in conventional silicone compositions as long as the effects of the present invention are not disturbed.

Examples of the additives include a diorganopolysiloxane as a dispersant, such as dimethylpolysiloxane having hydroxyl groups at the terminals and methylvinylpolysiloxane; a low-molecular weight organosilicon compound such as diphenylsilanediol, hexamethyldisilazane and organoalkoxysilane; a wetter such as water; inorganic fillers such as diatomaceous earth, quartz powder, calcium carbonate, aluminum hydroxide and carbon black; a heat-resistant agent such as cerium hydroxide, cerium silanolate and cerium fatty acid salt; a fatty acid and a metallic salt thereof, such as stearic acid, zinc stearate and calcium stearate; mold releasing agents such as wax; metal oxide such as iron oxide and titanium oxide; and pigments.

The present silicone composition may be prepared by uniformly mixing the aforesaid components using a rubber kneading machine, such as a two-roll mill, a banbury mixer, and a dough mixer (kneader). The mixing order, the temperature condition, and the time are not particularly limited and may be as in conventional methods.

A cured silicone rubber product is obtained by vulcanizing the present silicone composition under heating. The molding and curing method of the composition may be appropriately selected. For instance, the composition is molded by a method such as pressure molding, transfer molding, extrusion molding, injection molding and calender molding. The curing method may be selected depending on the kind of a curing agent. The cured silicone rubber product obtained from the present silicone composition has an excellent tracking resistance. Further, the obtained cured product has a tensile strength of 8 MPa or more, a tear strength (crescent) of 25 N/mm or more, and an elongation at break of 600% or more, as determined in accordance with the Japanese Industrial. Standards (JIS) K 6249:2003.

EXAMPLES

The present invention will be explained below in further detail with reference to a series of the Examples and the Comparative Examples, though the present invention is in no way limited by these Examples.

[Method for Determination of Properties of Cured Products]
[Mechanical Properties: Hardness, Tensile Strength, Tear Strength (Crescent Shape), Elongation at Break, and Tensile Permanent Strain]

Each silicone composition was compression-molded under heating conditions of 165 degrees C. for 10 minutes into a sheet shape having a thickness of 2 mm. Further, the sheet was subjected to secondary vulcanization at 200 degrees C. for 4 hours to obtain a silicone rubber sheet. Mechanical properties of the sheet were determined according to the Japanese Industrial Standards (JIS) K 6249:2003. The results are as shown in Table 1.

[Tracking Test]

A tracking test was carried out according to the IEC Publ.587 Standards, Method. 1 test, to thereby evaluate a silicone rubber sheet whether pass or fail.

Thus, the silicone rubber sheet having a thickness of 6 mm was prepared similarly as in the preceding paragraph 0061. A contaminated liquid (aqueous solution of 0.1 mass % of $NH_4Cl$ and 0.02 mass % of a nonionic surfactant) was dropped from an upper electrode on the five test sheets at a rate of 0.6 ml/min for 6 hours, at an applied voltage of 3.5 kV or 4.5 kV, a frequency of 50 Hz and an inter-electrode distance of 50 mm. When a track occurred on the test sheet and the sheet was broken by the leakage current, the test sheet was evaluated as fail. When the sheet was not broken, the test sheet was evaluated as pass. The presence or absence of the through holes on the five test sheets was confirmed, and the number of the test sheets having the through hole is shown in Table 1. Further, the minimum destruction time in minute, the maximum erosion depth in mm, and the average weight loss in %, are as shown in Table 1.

Preparation Example 1

95 parts by mass of (A-1) a raw rubber-like organopolysiloxane comprising 99.975 mol % of dimethylsiloxane units and 0.025 mol % of dimethylvinylsiloxane units and having an average polymerization degree of about 8,000, 5 parts by mass of (A-2) a raw rubber-like organopolysiloxane comprising 89.993 mol % of dimethylsiloxane units and 9.982 mol % of methylvinylsiloxane units and having an average polymerization degree of about 8,000, 35 parts by mass of (B) fumed silica hydrophobilized by dichlorodimethylsilane and having a specific surface area of 300 m²/g, and 3 parts by mass of dimethylpolysiloxane as a dispersant which had silanol groups at the both terminals, an average polymerization degree of 13, and a viscosity at 25 degrees C. of 15 mm²/s were kneaded with a kneader. Further, 1.0 part by mass of (D) polymer A represented by the following formula (3) was added to the mixture, kneaded, and heated at 180 degrees C. for 3 hours to obtain mixture A.

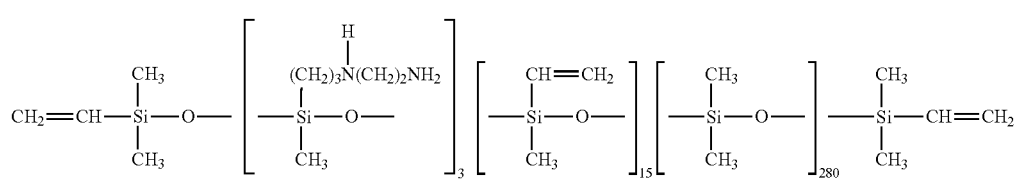

(3)

Preparation Example 2

99 parts by mass of (A-1) a raw rubber-like organopolysiloxane comprising 99.975 mol % of dimethylsiloxane units and 0.025 mol % of dimethylvinylsiloxane units and having an average polymerization degree of about 8,000, 1 part by mass of (A-2) a raw rubber-like organopolysiloxane comprising 97.000 mol % of dimethylsiloxane units, 2.975 mol % of methylvinylsiloxane units and 0.025 mol % of dimethylvinylsiloxane units and having an average polymerization degree of about 8,000, 35 parts by mass of (B) fumed silica hydrophobilized by dichlorodimethylsilane and having a specific surface area of 300 m$^2$/g, and 3 parts by mass of dimethylpolysiloxane as a dispersant which had silanol groups at the both terminals, an average polymerization degree of 13, and a viscosity at 25 degrees C. of 15 mm$^2$/s were kneaded with a kneader. Further, 1.0 part by mass of (D) polymer A represented by the aforesaid formula (3) was added to the mixture, kneaded, and heated at 180 degrees C. for 3 hours to obtain mixture B.

Preparation Example 3

90 parts by mass of (A-1) a raw rubber-like organopolysiloxane comprising 98.500 mol % of dimethylsiloxane units, 1.475 mol % of methylvinylsiloxane units and 0.025 mol % of dimethylvinylsiloxane units and having an average polymerization degree of about 8,000, 10 parts by mass of (A-2) a raw rubber-like organopolysiloxane comprising 90.000 mol % of dimethylsiloxane units, 9.975 mol % of methylvinylsiloxane units and 0.025 mol % of dimethylvinylsiloxane units and having an average polymerization degree of about 8,000, 35 parts by mass of (B) fumed silica hydrophobilized by dichlorodimethylsilane and having a specific surface area of 300 m$^2$/g, and 3 parts by mass of dimethylpolysiloxane as a dispersant which had silanol groups at the both terminals, an average polymerization degree of 13, and a viscosity at 25 degrees C. of 15 mm$^2$/s were kneaded with a kneader. Further, 1.0 part by mass of (D) polymer A represented by the aforesaid formula (3) was added to the mixture, kneaded, and heated at 180 degrees C. for 3 hours to obtain mixture C.

Preparation Example 4

95 parts by mass of (A-1) a raw rubber-like organopolysiloxane comprising 99.975 mol % of dimethylsiloxane units and 0.025 mol % of dimethylvinylsiloxane units and having an average polymerization degree of about 8,000, 5 parts by mass of (A-2) a raw rubber-like organopolysiloxane having 89.993 mol % of dimethylsiloxane units, 9.982 mol % of methylvinylsiloxane units and 0.025 mol % of dimethylvinylsiloxane units and having an average polymerization degree of about 8,000, 35 parts by mass of (B) fumed silica hydrophobilized by dichlorodimethylsilane and having a specific surface area of 300 m$^2$/g, and 3 parts by mass of dimethylpolysiloxane as a dispersant which had silanol groups at the both terminals, an average polymerization degree of 13, and a viscosity at 25 degrees C. of 15 mm$^2$/s were kneaded with a kneader, and heated at 180 degrees C. for 3 hours to obtain mixture D.

Example 1

100 parts by mass of mixture A obtained in Preparation Example 1, 0.1 part by mass of a solution of chloroplatinic acid hexahydrate in 2-ethylhexanol, containing 2 mass % of platinum, 0.1 parts by mass of carbon black, 5.0 parts by mass of titanium oxide, 0.5 part by mass of cerium oxide, 0.15 part by mass of (D) benzotriazole and 1 part by mass of (F) silicone oil which is represented by the following formula and had 42% of a phenyl group, based on the total number of the substituents were mixed by a two-roll mill. Further, 0.6 part by mass of (E) dicumyl peroxide was added as a curing agent and mixed by the two-roll mill to prepare silicone composition 1. Silicone composition 1 was molded and cured according to the aforesaid methods so as to prepare cured rubber products. The properties of the products were evaluated. The results are as shown in Table 1.

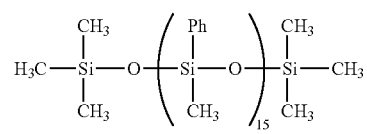

wherein the amount of the phenyl group is 42 mole %.

Example 2

100 parts by mass of mixture A obtained in Preparation Example 1, 0.1 part by mass of a solution of chloroplatinic acid hexahydrate in 2-ethylhexanol, containing 2 mass % of platinum, 0.1 parts by mass of carbon black, 5.0 parts by mass of titanium oxide, 0.5 part by mass of cerium oxide, 0.15 part by mass of (D) benzotriazole and 1 part by mass of (F) silicone oil which is represented by the following formula, comprising T units, and had 41% of a phenyl group, based on the total number of the substituents were added and mixed by a two-roll mill. Further, 0.6 part by mass of (E) dicumyl peroxide was added as a curing agent and mixed by the two-roll mill to prepare silicone composition 2. Silicone composition 2 was molded and cured according to the aforesaid methods so as to prepare cured rubber products. The properties of the products were evaluated. The results are as shown in Table 1.

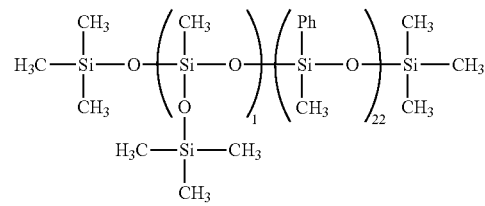

wherein the amount of the phenyl group is 41 mole %.

Example 3

100 parts by mass of mixture A obtained in Preparation Example 1, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, 0.15 part by mass of (D) benzotriazole and 1 part by mass of (F) silicone oil which is represented by the following formula and had 45% of a phenyl group, based on the total number of the substituents were added and mixed by a two-roll mill. Further, 0.6 part by mass of (E) dicumyl peroxide was added as a curing agent and mixed by the two-roll mill to prepare silicone composition 3. Silicone composition 3 was molded and cured according to the aforesaid methods so as to prepare cured rubber products. The properties of the products were evaluated. The results are as shown in Table 1.

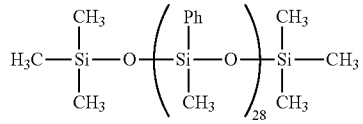

wherein the amount of the phenyl group is 45 mole %.

Example 4

100 parts by mass of mixture A, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, 0.15 part by mass of (D) benzotriazole and 1 part by mass of (F) silicone oil which is represented by the following formula, comprising T units, and had 41% of a phenyl group, based on the total number of the substituents were added and mixed by a two-roll mill. Further, 0.91 part by mass of (E) methylhydrogenpolysiloxane having SiH group at a side chain (a dimethylsiloxane-methylhydrogensiloxane copolymer whose both terminals are capped with a trimethylsiloxy group, having a polymerization degree of 40 and a SiH group of 0.074 mol/g) was added as a curing agent and mixed by the two-roll mill to prepare silicone composition 4. Silicone composition 4 was molded and cured according to the aforesaid methods so as to prepare cured rubber products. The properties of the products were evaluated. The results are as shown in Table 1.

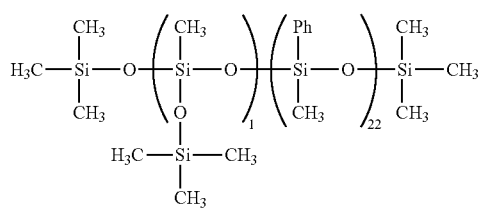

wherein the amount of the phenyl group is 41 mole %.

Example 5

100 parts by mass of mixture B obtained in Preparation Example 2, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, 0.15 part by mass of (D) benzotriazole and 1 part by mass of (F) silicone oil which is represented by the following formula and had 42% of a phenyl group, based on the total number of the substituents were added and mixed by a two-roll mill. Further, 0.6 part by mass of (E) dicumyl peroxide was added as a curing agent and mixed by the two-roll mill to prepare silicone composition 5. Silicone composition 5 was molded and cured according to the aforesaid methods so as to prepare cured rubber products. The properties of the cured products were evaluated. The results are as shown in Table 1.

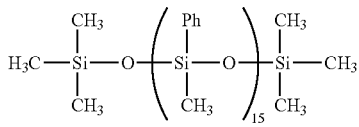

wherein the amount of the phenyl group is 42 mole %.

Example 6

100 parts by mass of mixture C obtained in Preparation Example 3, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, 0.15 part by mass of (D) benzotriazole and 1 part by mass of (F) silicone oil which is represented by the following formula and had 42% of a phenyl group, based on the total number of the substituents were added and mixed by a two-roll mill. Further, 0.6 part by mass of (E) dicumyl peroxide was added as a curing agent and mixed by the two-roll mill to prepare silicone composition 6. Silicone composition 6 was molded and cured according to the aforesaid method so as to prepare cured rubber products. The properties of the cured products were evaluated. The results are as shown in Table 1.

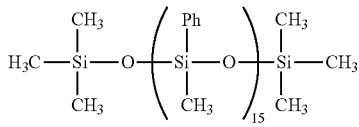

wherein the amount of the phenyl group is 42 mole %.

Comparative Example 1

100 parts by mass of mixture A obtained in Preparation Example 1, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, and 0.15 part by mass of (D) benzotriazole were added and mixed by a two-roll mill. Further, 0.6 part by mass of (E) dicumyl peroxide was added as a curing agent and mixed by the two-roll mill to prepare silicone composition 7. Silicone composition 7 was molded and cured according to the aforesaid methods so as to prepare cured rubber products. The properties of the cured products were evaluated. The results are as shown in Table 1.

Comparative Example 2

100 parts by mass of mixture A obtained in Preparation Example 1, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, 0.15 part by mass of (D) benzotriazole and 1 part by mass of (F') silicone oil which is represented by the following formula and had 27% of a phenyl group, based on the total number of the substituents were added and mixed by a two-roll mill. Further, 0.6 part by mass of (E) dicumyl peroxide was added as a curing agent and mixed by the two-roll mill to prepare silicone composition 8. Silicone composition 8 was molded and cured according to the aforesaid methods so as to prepare cured rubber products. The properties of the cured products were evaluated. The results are as shown in Table 1.

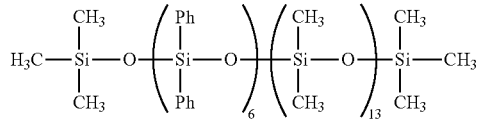

wherein the amount of the phenyl group is 27 mole %.

Comparative Example 3

100 parts by mass of mixture A, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, 0.15 part by mass of (D) benzotriazole and 1 part by mass of (F') silicone oil which is represented by the following formula and had 39% of a phenyl group, based on the total number of the substituents were added and mixed by a two-roll mill. Further, 0.6 part by mass of (E) dicumyl peroxide was added as a curing agent and mixed by the two-roll mill to prepare silicone composition 9. Silicone composition 9 was molded and cured according to the aforesaid methods so as to prepare cured rubber products. The properties of the cured products were evaluated. The results are as shown in Table 1.

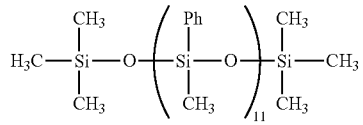

wherein the amount of the phenyl group is 39 mole %.

Comparative Example 4

100 parts by mass of mixture A, 0.1 part by mass of a solution of chloroplatinic acid hexahydrate in 2-ethylhexanol, containing 2 mass % of platinum, 0.1 part by mass of carbon black, 5.0 parts by mass of titanium oxide, 0.5 part by mass of cerium oxide, 0.15 part by mass of (D) benzotriazole and 1 part by mass of (F') silicone oil which is represented by the following formula and had 47% of a phenyl group, based on the total number of the substituents were added and mixed by a two-roll mill. Further, 0.6 part by mass of (E) dicumyl peroxide was added as a curing agent and mixed by the two-roll mill to prepare silicone composition 10. The silicone composition was molded and cured according to the aforesaid methods so as to prepare cured rubber products. The properties of the cured products were evaluated. The results are as shown in Table 1.

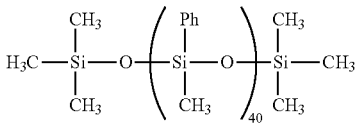

Comparative Example 5

100 parts by mass of mixture A, 0.1 parts by mass of carbon black, 5.0 parts by mass of titanium oxide, 0.5 part by mass of cerium oxide, 0.15 part by mass of (D) benzotriazole and 1 part by mass of (F) silicone oil which is represented by the following formula and had 44% of a phenyl group, based on the total number of the substituents were added and mixed by a two-roll mill. Further, 0.6 part by mass of (E) dicumyl peroxide was added as a curing agent and mixed by the two-roll mill to prepare silicone composition 11. Silicone composition 11 was molded and cured according to the aforesaid methods so as to prepare cured rubber products. The properties of the cured products were evaluated. The results are as shown in Table 1.

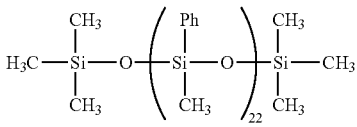

wherein the amount of the phenyl group is 44 mole %.

Comparative Example 6

100 parts by mass of mixture D obtained in preparation 4, 0.1 part by mass of a solution of chloroplatinic acid hexahydrate in 2-ethylhexanol, containing 2 mass % of platinum, 0.1 part by mass of carbon black, 5.0 parts by mass of titanium oxide, and 0.5 part by mass of cerium oxide, and 1 part by mass of (F) silicone oil which is represented by the following formula and had 44% of a phenyl group, based on the total number of the substituents were added and mixed by a two-roll mill. Further, 0.6 part by mass of (E) dicumyl peroxide was added as a curing agent and mixed by the two-roll mill to prepare silicone composition 12. Silicone composition 12 was molded and cured according to the aforesaid methods so as to prepare cured rubber products. The properties of the cured product were evaluated. The results are as shown in Table 1.

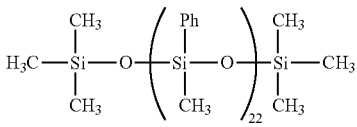

wherein the amount of the phenyl group is 44 mole %.

TABLE 1

|  | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|---|
| Composition No. | 1 | 2 | 3 | 4 | 5 | 6 | 7 | 8 | 9 | 10 | 11 | 12 |
| Hardness | 60 | 59 | 59 | 58 | 56 | 64 | 61 | 60 | 58 | 59 | 60 | 60 |
| Tensile strength, MPa | 9.2 | 9.1 | 9.2 | 9.1 | 8.1 | 8.2 | 9.1 | 8.9 | 8.9 | 8.7 | 8.9 | 9.1 |
| Elongation at break, % | 700 | 690 | 700 | 650 | 850 | 600 | 680 | 690 | 710 | 720 | 690 | 690 |
| Tear strength, kN/m | 39 | 39 | 38 | 41 | 31 | 30 | 35 | 38 | 34 | 35 | 35 | 36 |
| Tensile permanent strain, % | 8.2 | 7.8 | 7.9 | 3.2 | 10.2 | 10.5 | 8.1 | 7.8 | 8.3 | 8.5 | 8.3 | 7.9 |
| The minimum destruction time, min | 360< | 360< | 360< | 360< | 360< | 360< | 48 | 360< | 360< | 360< | 25 | 220 |
| The number of the test sheet having the through hole/Total number of the sheets | 0/5 | 0/5 | 0/5 | 0/5 | 0/5 | 0/5 | 5/5 | 2/5 | 4/5 | 4/5 | 5/5 | 5/5 |
| The maximum erosion depth, mm | 4.0 | 3.9 | 4.2 | 4.0 | 4.6 | 4.0 | 5.8 | 5.8 | 5.8 | 5.8 | 5.8 | 5.8 |
| Evaluation | Good | Good | Good | Good | Good | Good | Bad | Bad | Bad | Bad | Bad | Bad |
| The average weight loss, % | 0.94 | 0.67 | 0.99 | 0.79 | 1.04 | 0.80 | 9.41 | 1.33 | 7.20 | 6.71 | 15.00 | 9.20 |
| Evaluation | Good | Good | Good | Good | Good | Good | Bad | Poor | Bad | Bad | Bad | Bad |
| Tracking test | Pass | Pass | Pass | Pass | Pass | Pass | Fail | Pass | Pass | Pass | Fail | Fail |

As shown in Table 1 above, the cured products obtained from the compositions which do not contain component (C), (D) or (F) had poor tracking resistance (Comparative Examples 1, 5 and 6).

Further, the compositions of Comparative Examples 2 and 3 which comprised the organopolysiloxane having the smaller amount of the aromatic hydrocarbon groups in place of the present component (F) and the composition of Comparative Example 4 which comprised the organopolysiloxane having the excessive amount of the aromatic hydrocarbon groups in place of the present component (F) provided the cured products having good tracking resistance, but the erosion depth was somewhat large and the progress of the breakdown of the sheet was not prevented.

In contrast, the cured products obtained by curing the present silicone compositions had the small tensile permanent strains and were excellent in the mechanical strength such as tensile strength and tear strength. Furthermore, they were superior in tracking resistance and the progress of erosion was prevented. These results show that the present silicone composition has excellent high-voltage electrical insulation properties.

The cured product obtained by curing the present silicone composition is suitable for use in power cable connection and is useful as a material for connecting a power cable.

The invention claimed is:

1. A silicone composition comprising components (A) to (F),
   (A) 100 parts by mass of a raw rubber-like, at 25 degrees C., organopolysiloxane having at least two alkenyl groups each bonded to a silicon atom,
   (B) 5 to 100 parts by mass of silica powder having a specific surface area of 50 m²/g or more,
   (C) platinum or a platinum compound in an amount of 1 to 1,000 ppm by mass as a platinum atom, relative to the mass of component (A),
   (D) 0.01 to 5 parts by mass of a compound selected from an organic silicon compound having a nitrogen-containing organic group and an unsaturated hydrocarbon group, and benzotriazole and a derivative thereof,
   (E) an addition reaction curing agent other than said component (C), or an organic peroxide in an effective amount to cure the composition, and
   (F) 0.01 to 5 parts by mass of an aromatic hydrocarbon group-containing organopolysiloxane represented by the following general formula (1):

$$(R^1{}_3SiO_{1/2})_{n1}(R^1R^2SiO_{2/2})_{n2}(R^3SiO_{3/2})_{n3}(SiO_{4/2})_{n4} \qquad (1)$$

wherein $R^1$ is, independently of each other, a monovalent saturated aliphatic hydrocarbon group having 1 to 10 carbon atoms, $R^2$ is, independently of each other, a monovalent aromatic hydrocarbon group having 6 to 12 carbon atoms, $R^3$ is, independently of each other, a monovalent saturated aliphatic hydrocarbon group having 1 to 10 carbon atoms or a monovalent aromatic hydrocarbon group having 6 to 12 carbon atoms, wherein a proportion of the number of the monovalent aromatic hydrocarbon group to the total number of the substituents $R^1$, $R^2$ and $R^3$ is 41% or more and less than 46%, n1 is an integer of from 2 to 5, n2 is an integer of from 15 to 25, a total of n3 and n4 is an integer of from 0 to 3, $0<=\{n4/(n3+n4)\}\times 100<=5$, and a total of n1, n2, n3 and n4 is an integer of from 17 to 30.

2. The silicone composition according to claim 1, wherein component (A) comprises the following components (A-1) and (A-2);
   (A-1) a raw rubber-like, at 25 degrees C., organopolysiloxane having 0.001 to 2% of the alkenyl group, based on the total number of the substituents bonded to silicon atoms in an amount of 60 to 99 parts by mass, and
   (A-2) a raw rubber-like, at 25 degrees C., organopolysiloxane having more than 2% and 20% or less of the alkenyl group, based on the total number of substituents bonded to silicon atoms, in an amount such that a total amount of components (A-1) and (A-2) is 100 parts by mass.

3. The silicone composition according to claim 1 or 2, wherein component (F) is represented by the following formula (2),

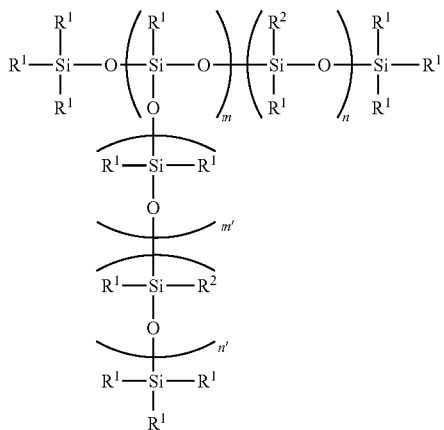

(2)

wherein $R^1$ and $R^2$ are as defined above, m is an integer of from 0 to 3, m' is an integer of from 0 to 3, n' is an integer of from 0 to 3, n is an integer of from 10 to 20, and a total of m, m', n and n' is an integer of from 14 to 27.

4. The silicone composition according to claim 1 for a power cable.

5. A cured silicone rubber product obtained by curing the silicone composition according to claim 1.

6. The cured silicone rubber product according to claim 5, having a tensile strength of 8 MPa or more, as determined according to the Japanese Industrial Standards (JIS) K 6249: 2003.

7. The cured silicone rubber product according to claim 5 or 6, having tear strength (crescent) of 25 N/mm or more, as determined according to the Japanese Industrial Standards (JIS) K 6249: 2003.

8. The cured silicone rubber product according to claim 5, having elongation at break of 600% or more, as determined according to the Japanese Industrial Standards (JIS) K 6249: 2003.

9. A power cable provided with the cured silicone rubber product according to claim 5.

\* \* \* \* \*